(12) United States Patent
Funaki et al.

(10) Patent No.: US 8,300,901 B2
(45) Date of Patent: *Oct. 30, 2012

(54) SIMILARITY ANALYZING DEVICE, IMAGE DISPLAY DEVICE, IMAGE DISPLAY PROGRAM STORAGE MEDIUM, AND IMAGE DISPLAY METHOD

(75) Inventors: Isao Funaki, Kawasaki (JP); Hiroyuki Maekawa, Kawasaki (JP); Aki Kita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,796

(22) Filed: Nov. 21, 2011

(65) Prior Publication Data

US 2012/0063642 A1 Mar. 15, 2012

Related U.S. Application Data

(63) Continuation of application No. 12/081,415, filed on Apr. 15, 2008, now Pat. No. 8,107,690.

(30) Foreign Application Priority Data

Apr. 16, 2007 (JP) ................................ 2007-107222

(51) Int. Cl.
*G06K 9/00* (2006.01)

(52) U.S. Cl. ...................................................... 382/118

(58) Field of Classification Search ......................... None
See application file for complete search history.

(56) References Cited

U.S. PATENT DOCUMENTS

| 7,519,200 | B2 | 4/2009 | Gokturk et al. |
| 7,522,773 | B2 | 4/2009 | Gallagher et al. |
| 7,873,208 | B2 | 1/2011 | Hamanaka |
| 2002/0067856 | A1 | 6/2002 | Fujii et al. |
| 2004/0008873 | A1 | 1/2004 | Sogo et al. |
| 2004/0247177 | A1* | 12/2004 | Rowe et al. ................... 382/159 |
| 2006/0018522 | A1 | 1/2006 | Sunzeri et al. |
| 2008/0235184 | A1 | 9/2008 | Nakamura |

FOREIGN PATENT DOCUMENTS

JP 2000-112972 4/2000

(Continued)

OTHER PUBLICATIONS

Japanese Office Action dated Dec. 1, 2009 in corresponding Japanese Patent Application 2007-107222.

(Continued)

*Primary Examiner* — Brian P Werner
(74) *Attorney, Agent, or Firm* — Fujitsu Patent Center

(57) ABSTRACT

A similarity analyzing device includes: an image acquisition section which acquires picked-up images with which image pick-up dates and/or times are associated; and an image registration section which registers a face image showing a picked-up face and with which an image pick-up date and/or time is associated. The device further includes: a degree of similarity calculation section which detects a face in each of picked-up images acquired by the image acquisition section and calculates the degree of similarity between the detected face and the face in the face image registered in the image registration section; and a degree of similarity reduction section in which the larger the difference between the image pick-up date and/or time associated with the picked-up image and that associated with the face image is, the more the degree of similarity of the face calculated by the degree of similarity calculation section is reduced.

8 Claims, 14 Drawing Sheets

FOREIGN PATENT DOCUMENTS

| | | |
|---|---|---|
| JP | 2000-148795 | 5/2000 |
| JP | 2001-357067 | 12/2001 |
| JP | 2002-170119 | 6/2002 |
| JP | 2004-172849 | 6/2006 |
| JP | 2006-163527 | 6/2006 |
| JP | 2006-236217 | 9/2006 |
| JP | 2006-314010 | 11/2006 |
| JP | 2006-345296 | 12/2006 |
| WO | WO-2005/096180 A1 | 10/2005 |

OTHER PUBLICATIONS

Chinese Office Action issued Jan. 22, 2010 in corresponding Chinese Patent Application 200810091078.3.

Japanese Office Action dated May 12, 2009 in corresponding Japanese Patent Application 2007-107222.

Korean Office Action issued on May 27, 2009 in corresponding Korean Patent Application 10-2008-0032979.

Japanese Office Action dated Aug. 11, 2009 and issued in corresponding Japanese Patent Application 2007-107222.

USPTO, (Werner) Notice of Allowance and Notice of Allowability, Oct. 19, 2011, in parent U.S Appl. No. 12/081,415 [not allowed].

USPTO, (Werner) Final Rejection, Jun. 23, 2011, in parent U.S. Appl. No. 12/081,415 [not allowed].

USPTO, (Werner) Non-Final Rejection, Mar. 10, 2011, in parent U.S. Appl. No. 12/081,415 [not allowed].

* cited by examiner

SIMILARITY ANALYZING DEVICE, IMAGE DISPLAY DEVICE, IMAGE DISPLAY PROGRAM STORAGE MEDIUM, AND IMAGE DISPLAY METHOD

CROSS-REFERENCE TO RELATED APPLICATION

This application is a continuation of application Ser. No. 12/081,415, filed Apr. 15, 2008, which claims priority of Japan Patent Application 2007-107222 filed on Apr. 16, 2007, the entire disclosures of which are hereby incorporated by reference.

BACKGROUND OF THE INVENTION

1. Field of the Invention

The present invention relates to a similarity analyzing device, an image display device for displaying a list of picked-up images, an image display program storage medium, and an image display method, for analyzing the degree of similarity between plural faces.

2. Description of the Related Art

Recently, image pick-up devices can be carried with ease because most compact equipment such as mobile phones and the like, which are carried at all times, have an image pick-up device mounted thereon in addition to that digital cameras are rapidly made compact. Since image pick-up devices mounted on digital cameras and compact equipment can acquire digital picked-up images, the picked-up images can be instantly displayed on a liquid crystal display in a field and the like for confirmation, and unnecessary picked-up images can be deleted before they are printed out. Further, when plural picked-up images are collectively recorded to a recording medium and the like, the picked-up images can be stored in high image quality without taking up much space.

As a method of effectively putting picked-up images in order, applications for album are widely used to put them in order using personal computers. The personal computers are advantageous in that they can store a lot of picked-up images without paying any heed to a remaining capacity because they have a large capacity hard disc device images and that a job for copying picked-up images and attaching them to an electronic mail and the like can be easily carried out.

Further, in the field of an image processing, a scene analyzing technique for analyzing an image pick-up scene in which an image is being picked-up, a face extracting technique for extracting a face being picked up, and the like are widely known, and further, in the field of the applications for album, an additional function, to which the scene analyzing technique and the face extracting technique are applied, is being developed. As to this point, there is devised an image display method in which when a face image is previously registered, a picked-up image, on which a face which resembles the registered face is picked up, is searched from a lot of picked-up images stored in a hard disc device and the like and displayed (for example, Japanese Patent Application Publication Nos. 2006-314010 and 2004-172849). According to the image display method, even if a lot of picked-up images are stored, a picked-up image on which a friend, a family, and the like are picked up can be easily searched and attached to an e-mail and the like, thereby a communication can be improved.

The face extracting technique described above and the like ordinarily extracts a face by searching an image portion having a characteristic shape in a picked-up image such as eyes, a nose, a mouth, and the like. Therefore, there are problems such as one that when it is intended to search, for example, a picked-up image on which a daughter is picked up, even a picked-up image of her mother whose face in her early days resembles that of the daughter in the respective portions of the face is also searched, and another one that it is difficult to discriminate babies having a roundish shape in the respective portions of their faces from each other.

SUMMARY OF THE INVENTION

In view of the above circumstances, the present invention provides a similarity analyzing device, an image display device, an image display program storage medium, and an image display method capable of accurately analyzing a degree of similarity between the face image of a predetermined person and a face being picked up.

A similarity analyzing device according to the present invention includes:

an image acquisition section which acquires a plurality of picked-up images with which image pick-up dates and/or times are associated;

an image registration section which registers a face image which shows a picked-up face and with which an image pick-up date and/or time is associated;

a degree of similarity calculation section which detects a face of each of the plurality of picked-up images acquired by the image acquisition section and calculates the degree of similarity between the detected face and the face in the face image registered in the image registration section; and a degree of similarity reduction section in which the larger a difference between the image pick-up date and/or time associated with the picked-up image and the image pick-up date and/or time associated with the face image is, the more the degree of similarity of the face calculated by the degree of similarity calculation section is reduced.

According to the similarity analyzing device of the present invention, the larger the difference between image pick-up date and/or time of the picked-up image and that of the face image is, the more the degree of similarity between the face in a picked-up image and the face in a registered face image is reduced. When, for example, the face image of a daughter is registered, the degree of similarity calculation section calculates a high degree of similarity between the face image of the daughter and a picked-up image on which a mother of the daughter in her young days is picked up. However, since the image pick-up dates and/or times of these picked-up images are greatly different from each other, the degree of similarity reduction section greatly reduces the calculated degree of similarity. As described above, since the similarity analyzing device of the present invention takes the difference between the image pick-up dates and/or times, at which the images were picked up, into consideration, in addition to the degree of similarity between the faces in the images, the degree of similarity can be accurately analyzed.

In the similarity analyzing device of the present invention, it is preferable that the image registration section registers a face image with which an age is associated in addition to the image pick-up date and/or time, and in the degree of similarity reduction section, the larger the difference is, the more the degree of similarity is reduced, as well as the degree of similarity is reduced according to the age.

Ordinarily, although the face of a person greatly changes in his or her childhood, the face less changes when the person becomes an adult. Thus, the accuracy of calculation of the degree of similarity can be improved by greatly reducing the degree of similarity in the age of a child and suppressing the reduction of the degree of similarity in the age of an adult.

An image display device of the present invention includes:

an image acquisition section which acquires a plurality of picked-up images with which image pick-up dates and/or times are associated;

an image registration section which registers a face image which shows a picked-up face and with which an image pick-up date and/or time is associated;

a degree of similarity calculation section which detects a face of each of the plurality of picked-up images acquired by the image acquisition section and calculates the degree of similarity between the detected face and the face in the face image registered in the image registration section;

a degree of similarity reduction section in which the larger a difference between the image pick-up date and/or time associated with the picked-up image and the image pick-up date and/or time associated with the face image is, the more the degree of similarity of the face calculated by the degree of similarity calculation section is reduced; and an image display section which displays the plurality of picked-up images acquired by the image acquisition section in descending order of degree of similarity.

According to the image display device of the present invention, even if a lot of picked-up images are stored, a picked-up image, on which picked up is a face having a large degree of similarity to the face of a predetermined person in the picked-up images, can be effectively confirmed.

In the image display device of the present invention, it is preferable that the image registration section registers a face image with which an age is associated in addition to the image pick-up date and/or time, and in the degree of similarity reduction section, the larger the difference is, the more the degree of similarity is reduced, as well as the degree of similarity is reduced according to the age.

According to this preferable image display device, the degree of similarity between the face in a face image and the face in a picked-up image can be more accurately calculated.

In the image display device of the present invention, it is preferable that the image display section display a three-dimensional space having an axis of the degree of similarity and dispose the picked-up image at the position of the degree of similarity of the picked-up image reduced by the degree of similarity reduction section on the three-dimensional space.

The degree of similarity between the face in a face image and the face in a picked-up image can be easily calculated by the position at which the picked-up image is disposed on the three-dimensional space.

It is preferable that the image display device of the present invention include an auxiliary display section which displays a two-dimensional space having an axis of the degree of similarity and disposes a mark at the position of the degree of similarity of the picked-up image reduced by the degree of similarity reduction section on the two-dimensional space to show that the picked-up image exists.

When a lot of picked-up images are arranged and disposed sequentially from a picked-up image in descending order of degree of similarity, there is a possibility whether the picked-up images are present or not cannot be found because the positions at which they are disposed overlap. The existence of picked-up images can be easily recognized by disposing and displaying the marks on the two-dimensional space in addition to the display by the image display section.

It is preferable that the image display device of the present invention further include:

a designation section which designates the degree of similarity on the two-dimensional space by displaying a designation frame along an axis different from the axis of the degree of similarity on the two-dimensional space, and moving the designation frame along the axis of the degree of similarity; and a display control section which causes the image display section to dispose the picked-up image having the degree of similarity designated by the designation section on a foremost surface in a three-dimensional space.

It is preferable that the image display device of the present invention include an image number display section which displays the number of the picked-up images having the degree of similarity designated by the designation section According to this preferable image display device, the number of the picked-up images having the degree of similarity designated by the designation section can be easily confirmed.

In the image display device of the present invention, it is preferable that the data acquisition section acquire a plurality of picked-up images from a storage section in which the plurality of picked-up images are stored.

According to this preferable image display device, even if a lot of picked-up images are stored in a hard disc device and the like, a picked-up image, on which a face which resembles the face in a registered face image is picked up, can be easily confirmed.

An image display program storage medium of the present invention stores an image display program which is executed and constructs in a computer:

an image acquisition section which acquires a plurality of picked-up images with which image pick-up dates and/or times are associated;

an image registration section which registers a face image which shows a picked-up face and with which an image pick-up date and/or time is associated;

a degree of similarity calculation section which detects a face of each of the plurality of picked-up images acquired by the image acquisition section and calculates the degree of similarity between the detected face and the face in the face image registered in the image registration section;

a degree of similarity reduction section in which the larger a difference between the image pick-up date and/or time associated with the picked-up image and the image pick-up date and/or time associated with the face image is, the more the degree of similarity of the face calculated by the degree of similarity calculation section is reduced; and an image display section which displays the plurality of picked-up images acquired by the image acquisition section in descending order of degree of similarity.

Note that only the basic feature of the image display program storage medium is described, but this is only to avoid a duplication, and the image display program storage medium according to the present invention is not limited to the above basic feature and includes various features corresponding to the respective various features of the image display device described above.

Further, in the elements such as the image acquisition section and the like which are constructed on a computer system by the image display program of the present invention, one element may be constructed by one program part or a plurality of elements may be constructed by one program part. Further, these elements may be constructed so as to execute the operations thereof by themselves or may be constructed so as to execute the operations by instructing other program and program part assembled to the computer system.

Further, an image display method of the present invention includes:

an image acquisition step which acquires a plurality of picked-up images with which image pick-up dates and/or times are associated;

an image registration step which registers a face image which shows a picked-up face and with which an image pick-up date and/or time is associated;

a degree of similarity calculation step which detects a face of each of the plurality of picked-up images acquired by the image acquisition step and calculates the degree of similarity between the detected face and the face in the face image registered in the image registration step;

a degree of similarity reduction step in which the larger a difference between the image pick-up date and/or time associated with the picked-up image and the image pick-up date and/or time associated with the face image is, the more the degree of similarity of the face calculated in the degree of similarity calculation step is reduced; and an image display step which displays the plurality of picked-up images acquired in the image acquisition step in descending order of degree of similarity.

According to the image display method of the present invention, even if a lot of picked-up images are stored, a picked-up image, on which a face having a high degree of similarity to the face of a predetermined person is picked up, can be efficiently confirmed in the lot of picked-up images.

Note that only the basic feature of the display method is also described here, but this is only to avoid a duplication, and the display method according to the present invention is not limited to the above basic feature and includes various features corresponding to the respective various features of the image display device described above.

According to the present invention, the degree of similarity between the face of a predetermined person and the face in a picked-up image can be accurately analyzed.

DETAILED DESCRIPTION OF THE INVENTION

Figure 1:
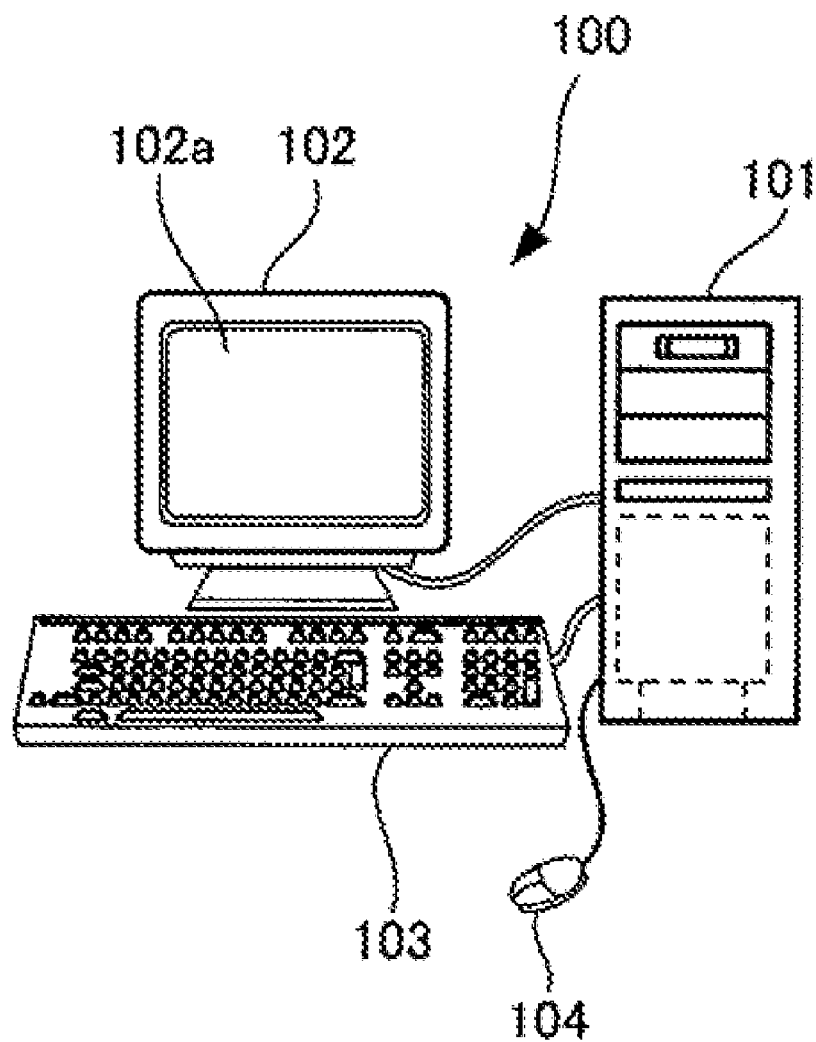
FIG. 1 is an outside appearance view of a personal computer to which an embodiment of the present invention is applied.

An embodiment of the present invention will be described below referring to the drawings.

FIG. 1 is an outside appearance view of a personal computer to which an embodiment of the present invention is applied.

A personal computer 100 includes a main body device 101, an image display device 102, a keyboard 103, and a mouse 104. The image display device 102 displays an image on a display screen 102a in response to an instruction from the main body device 101, the keyboard 103 inputs various types of information to the main body device 101 in response to a key operation, and the mouse 104 designates an arbitrary position on the display screen 102a and inputs an instruction according to, for example, an icon and the like displayed at the position. Further, although not shown, the main body device 101 has a CD/DVD mounting port, to which a DVD or a CD-ROM is mounted, and an FD mounting port to which a flexible disc (hereinafter, abbreviated as FD) is mounted.

Figure 2:
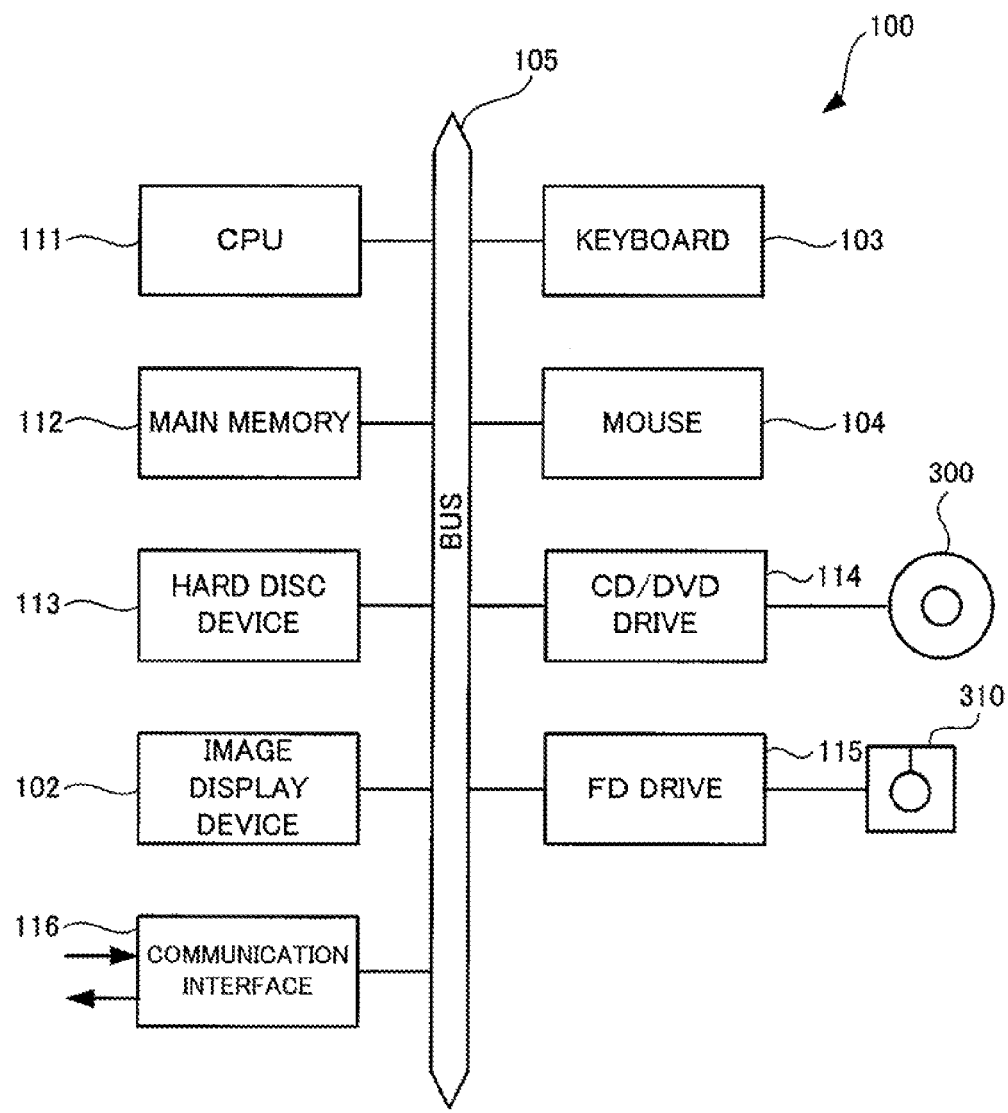
FIG. 2 is a diagram showing an internal configuration of the personal computer.

FIG. 2 is a diagrams showing an internal configuration of the personal computer 100.

As shown in FIG. 2, the main body device 101 includes in its inside a CPU 111, a main memory 112, a hard disc device 113, a CD/DVD drive 114, an FD drive 115, and a communication interface 116. The CPU 111 executes various types of programs, the main memory 112 is used such that the programs stored in the hard disc device 113 are read out thereto and developed therein so that they are executed by the CPU 111, the hard disc device 113 stores the various types of the programs, data, and the like, the CD/DVD drive 114 accesses a CD-ROM 300 or a DVD when it is mounted thereon, the FD drive 115 accesses a FD 310 when it is mounted thereon, and the communication interface 116 is connected to an external device such as a digital camera and the like and transmits and receives data to and from the external device. These various types of elements are connected to the image display device 102, the keyboard 103, and the mouse 104, which are also shown in FIG. 2, through a bus 105.

The CD-ROM 300 stores an image display program to which an embodiment of the image display program storage medium of the present invention is applied. The CD-ROM 300 is mounted on the CD/DVD drive 114, and the image display program stored in the CD-ROM 300 is uploaded to the personal computer 100 and stored in the hard disc device 113. When the image display program is started and executed, a picked-up image display device 500 (refer to FIG. 4), to which an embodiment of the display device of the present invention is applied, is constructed in the personal computer 100.

Next, the image display program executed in the personal computer 100 will be described.

Figure 3:
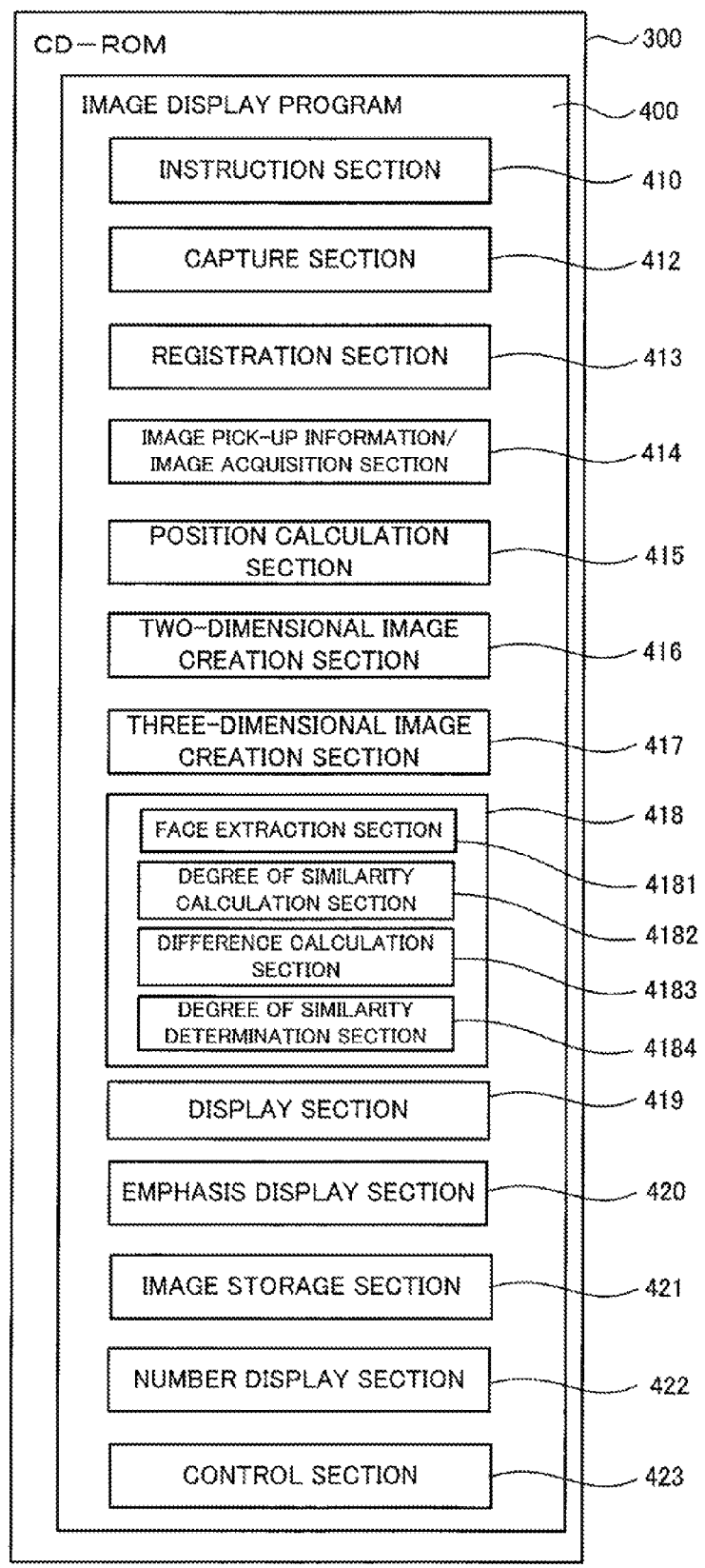
FIG. 3 is a conceptual view showing a CD-ROM in which an image display program is stored.

FIG. 3 is a conceptual view showing the CD-ROM 300 to which the image display program is stored.

The image display program 400 is composed of an instruction section 410, a capture section 412, a registration section 413, an picked-up image information/image acquisition section 414, a position calculation section 415, a two-dimensional image creation section 416, a three-dimensional image creation section 417, an analyzing section 418, a display section 419, an emphasis display section 420, an image storage section 421, a number display section 422, and a control section 423. The analyzing section 418 includes a face extraction section 4181, a degree of similarity calculation section 4182, a difference calculation section 4183, and a degree of similarity determination section 4184. The respective sections of the image display program 400 will be described in detail together with the operations of the respective sections of the picked-up image display device 500.

Note that although the CD-ROM 300 is used as an example of the image display program storage medium of the present invention, but the image display program storage medium of the present invention is not limited to the CD-ROM and may be a storage medium such as an optical disc, MO, FD, a magnetic tape, and the like other than the CD-ROM. Further, the display program of the present invention may be directly supplied to the computer through a communication network without using the storage medium.

Figure 4:
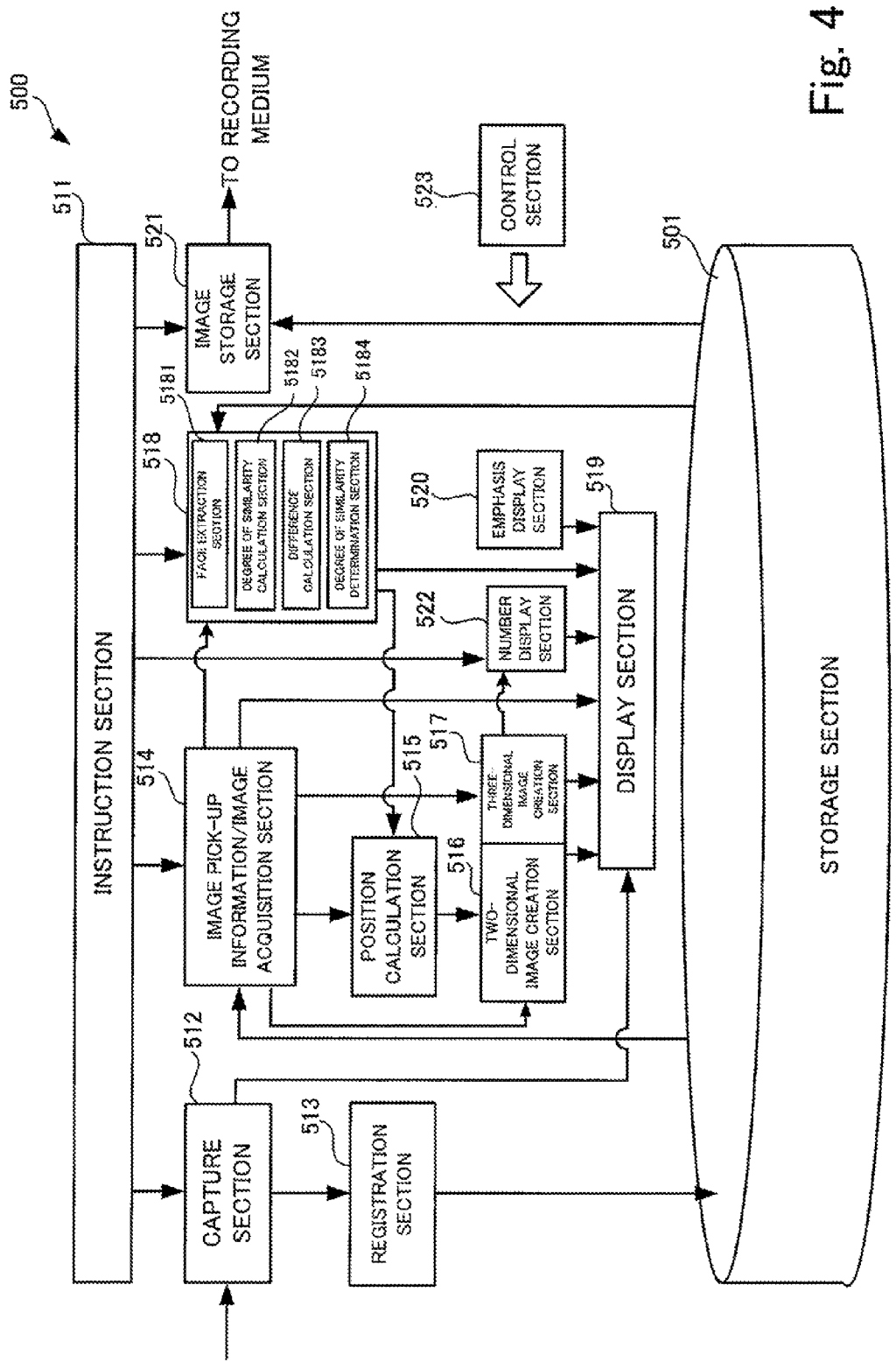
FIG. 4 is a function block diagram of a picked-up image display device.

FIG. 4 is a function block diagram of the picked-up image display device constructed in the personal computer 100 when the image display program 400 is installed on the personal computer 100 shown in FIG. 1.

The picked-up image display device 500 shown in FIG. 4 includes an instruction section 511, a capture section 512, a registration section 513, a picked-up image information/image acquisition section 514, a position calculation section 515, a two-dimensional image creation section 516, a three-dimensional image creation section 517, an analyzing section 518, a display section 519, an emphasis display section 520, an image storage section 521, a number display section 522, a control section 523, and a storage section 501. The analyzing section 518 further includes a face extraction section 5181, a degree of similarity calculation section 5182, a difference calculation section 5183, and a degree of similarity determination section 5184. When the image display program 400 shown in FIG. 3 is installed on the personal computer 100 shown in FIG. 1, the instruction section 410 of the image display program 400 constructs the instruction section 511 of FIG. 4. In the same manner, the capture section 412 constructs the capture section 512, the registration section 413 constructs the registration section 513, the picked-up image information/image acquisition section 414 constructs the picked-up image information/image acquisition section 514, the position calculation section 415 constructs the position calculation section 515, the two-dimensional image creation section 416 constructs the two-dimensional image creation section 516, the three-dimensional image creation section 417 constructs the three-dimensional image creation section 517, the analyzing section 418 constructs the analyzing section 518, the face extraction section 4181 constructs the face extraction section 5181, the degree of similarity calculation section 4182 constructs the degree of similarity calculation section 5182, the difference calculation section 4183 constructs difference calculation section 5183, the degree of similarity determination section 4184 constructs the degree of similarity determination section 5184, the display section 419 constructs the display section 519, the emphasis display section 420 constructs the emphasis display section 520, the image storage section 421 constructs the image storage section 521, the number display section 422 constructs the number display section 522, and the control section 423 constructs the control section 523.

The respective elements of FIG. 4 are different from the respective elements of the image display program 400 shown in FIG. 3 in that the former elements are composed of a combination of hardware of the computer and OS and application programs executed by the computer, whereas the latter elements are composed of only the application programs.

The respective elements of the picked-up image display device 500 shown in FIG. 4 will be described below, by which the respective elements of the image display program 400 shown in FIG. 3 will be also described.

The picked-up image display device 500 shown in FIG. 4 shows a list of picked-up image data which represents the images of a picked-up subject as well as records the picked-up image data selected by a user to a recording medium and the like.

When a digital camera or a recording medium, to which picked-up images are recorded, is connected to the personal computer 100 shown in FIG. 1, the capture section 512 captures picked-up images to which picked-up image information such as image pick-up date/time, image pick-up conditions, and the like is attached. The captured picked-up image data and the picked-up image information are transmitted to the registration section 513.

The registration section 513 creates thumbnail images by reducing the picked-up images represented by the picked-up image data transmitted from the capture section 512 and stores the picked-up image data to the storage section 501 together with the picked-up image information and the thumbnail images.

The hard disc device 113 shown in FIG. 2 has the role of the storage section 501 and stores the picked-up image data representing the picked-up images, the picked-up image information indicating the image pick-up conditions, the image pick-up dates/times, and the like of the picked-up images and the thumbnail images in which the picked-up images are reduced as a set. The storage section 501 corresponds to an example of the storage section according to the present invention.

The picked-up image display device 500 of the embodiment has an "image pick-up date/time mode" and a "person mode". In the "image pick-up date/time mode", the picked-up images stored in the storage section 501 are arranged and displayed based on image pick-up date/time, and, in the "person mode", a face image is previously registered, and the picked-up images stored in the storage section 501 are arranged and displayed in the sequence in which they have a higher degree of similarity to the face of the registered face image. An image pick-up date/time button for executing the "image pick-up date/time mode" and a person button for executing the "person mode" are previously prepared. First, how a list of the picked-up images is displayed in the "image pick-up date/time mode" will be described.

Figure 5:
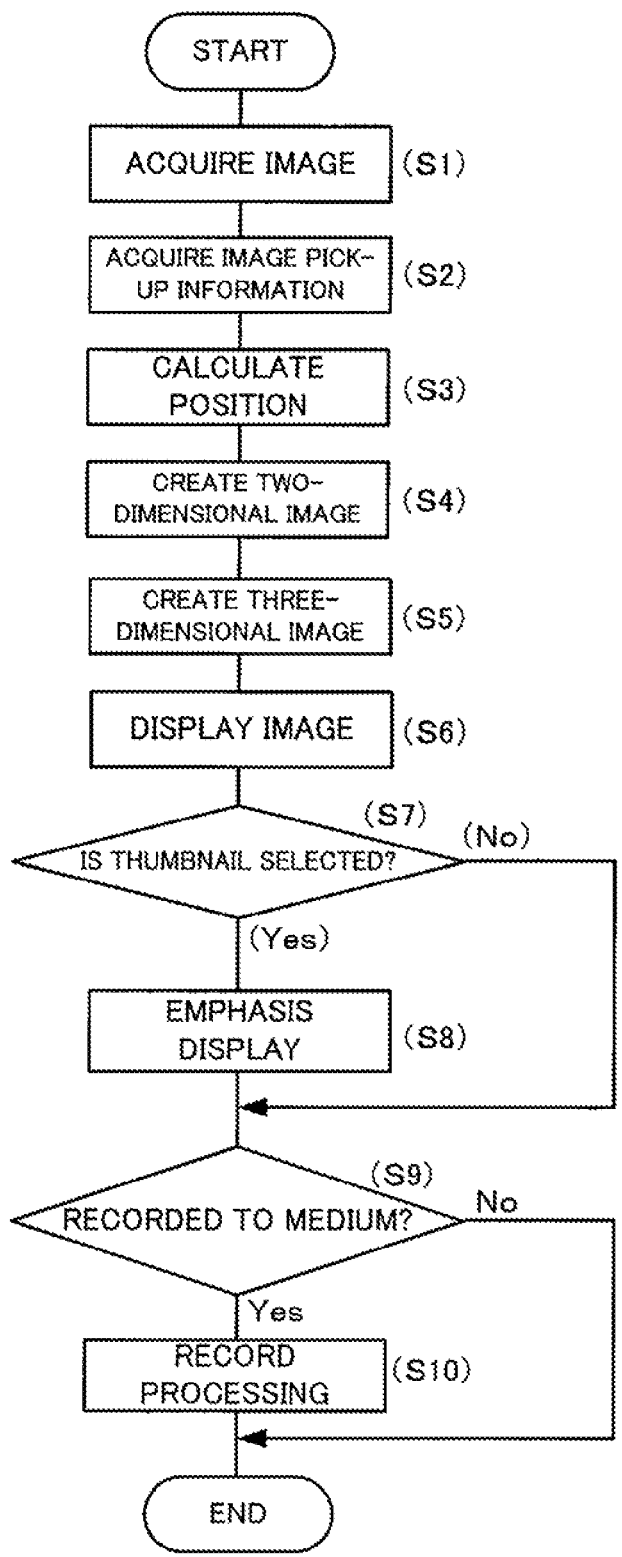
FIG. 5 is a flowchart showing a flow of a processing for displaying a list of picked-up images executed in an image pick-up date/time mode.

FIG. 5 is a flowchart showing a flow of a processing for displaying the list of picked-up images executed in the image pick-up date/time mode.

When the user selects the image pick-up date/time button using the mouse 104 and the like, the instruction section 511 of FIG. 4 instructs the picked-up image information/image acquisition section 514 to execute the "image pick-up date/time mode".

When it is instructed to display the list, the picked-up image information/image acquisition section 514 acquires the thumbnail images and the picked-up image information stored in the storage section 501 (steps S1 and S2 of FIG. 5). The thumbnail images are created by reducing the picked-up images and are equal to the data corresponding to the picked-up images. The acquired picked-up image information is transmitted to the position calculation section 515, and the acquired thumbnail images are transmitted to the three-dimensional image creation section 517.

The position calculation section 515 calculates a three-dimensional position, to which the image pick-up date/time included in the picked-up image information transmitted from the picked-up image information/image acquisition section 514 corresponds, on a three-dimensional space, which has three axes, that is, an axis sectioning one day to each four hours, an axis further sectioning the four hours to each one hour, and an axis showing one day and calculates a two-dimensional position, which corresponds to the three-dimensional position, on a two-dimensional space having two axes, that is, an axis sectioning one day to each four hours and an axis showing one day (step S3 of FIG. 5).

Figure 6:
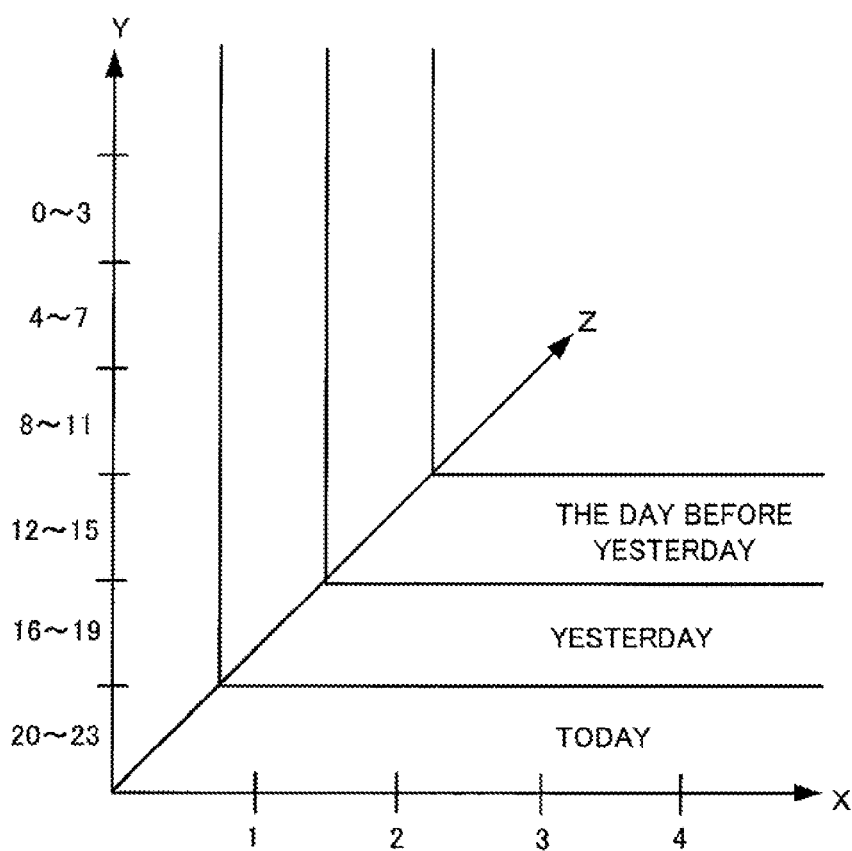
FIG. 6 is a conceptual view showing an example of a three-dimensional space.
Figure 7:
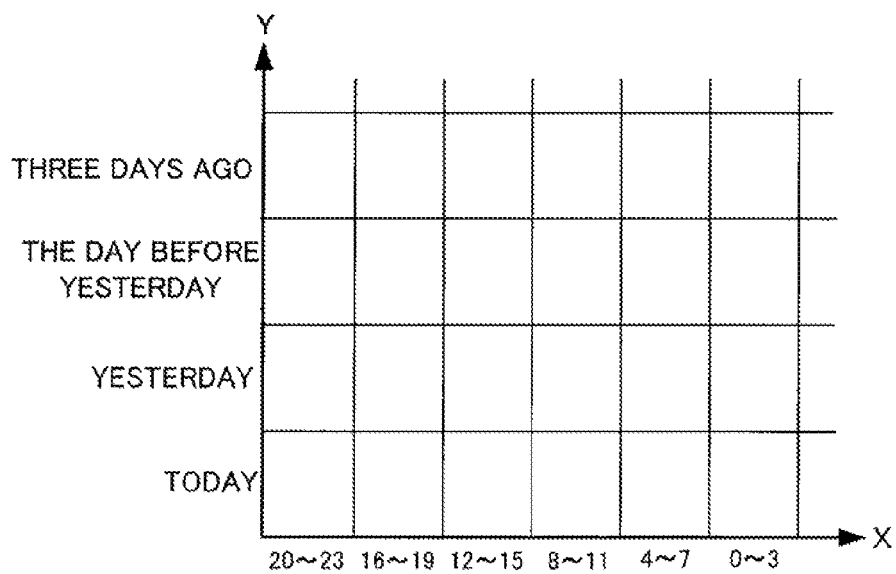
FIG. 7 is a conceptual view showing an example of a two-dimensional space.

FIG. 6 is a conceptual view showing an example of the three-dimensional space, and FIG. 7 is a conceptual view showing an example of the two-dimensional space.

As shown in FIG. 6, the three-dimensional space is applied to the embodiment, where the three-dimensional space has a Y-axis (longitudinal direction) showing values acquired by sectioning one day to each four hours, an X-axis (lateral direction) showing values acquired by further sectioning the four hours allocated to the Y-axis to each one hour, and Z-axis (depth direction) showing one day.

Values 2, 3, 4 starting from 1 are sequentially allocated to the X-axis of the three-dimensional space, and a value, which is acquired by adding 1 to the value acquired by dividing the "HH o'clock" of an image pick-up date/time (YYYY year, MM month, DD date, PP minutes past HH o'clock) by 4, is obtained as a value on the X-axis.

Respective four hours of 19 o'clock to 16 o'clock, . . . , 7 o'clock to 4 o'clock, 3 o'clock to 0 o'clock are sequentially allocated to the Y-axis of the three-dimensional space using the four hours from 23 o'clock to 20 o'clock as a start point. A value acquired by dividing the "HH o'clock" of the image pick-up date/time (YYYY year, MM month, DD date, PP minutes past HH o'clock) by 4 is obtained as a value on the Y-axis.

Yesterday, the daybefore yesterday, . . . , are sequentially allocated to the Z-axis of the three-dimensional space from today as a start point, and a value on the Z-axis is calculated based on an image pick-up date/time (YYYY year, MM month, DD date, PP minutes past HH o'clock).

Further, as shown in FIG. 7, the two-dimensional space is applied in the embodiment, where the two-dimensional space has an X-axis (lateral direction) showing values acquired by sectioning one day to each four hours and a Y-axis (longitudinal direction) showing one day.

Likewise the Y-axis of the three-dimensional space shown in FIG. 6, respective four hours of from 19 o'clock to 16 o'clock, . . . , from 7 o'clock to 4 o'clock, and from 3 o'clock to 0 o'clock are sequentially allocated to the X-axis of the two-dimensional space using the four hours from 23 o'clock to 20 o'clock as a start point, and the values on the Y-axis in the three-dimensional space are calculated as the values on the X-axis in the two-dimensional space as they are.

Yesterday, the daybefore yesterday, . . . , are sequentially allocated to the Y-axis of the two-dimensional space from today as a start point, and the values on the Z-axis in the three-dimensional space are calculated as the values on the Y-axis in the two-dimensional space as they are.

When, for example, plural images are picked up in the same time zone of the same date, plural positions are calculated in correspondence to the "HH o'clock"s as the image pick-up dates/times of the respective picked-up images as the positions on the three-dimensional space. However, the same position is calculated for the plural picked-up images as the position on the two-dimensional space. That is, a mark on the two-dimensional space shows that one or more picked-up images picked-up in the same time zone of the same date exist.

The position calculated on the two-dimensional space (two-dimensional position) is transmitted to the two-dimensional image creation section 516, and the position calculated on the three-dimensional space (three-dimensional position) is transmitted to the three-dimensional image creation section 517.

The two-dimensional image creation section 516 creates a two-dimensional image in which the mark showing that the picked-up image exists is disposed at the two-dimensional position on the two-dimensional space transmitted from the position calculation section 515 (step S4 of FIG. 5). The created two-dimensional image is transmitted to the display section 519.

The control section 523 instructs the display section 519 to display a scroll bar along the Y-axis on the two-dimensional space.

The three-dimensional image creation section 517 creates a three-dimensional image in which the thumbnail images transmitted from the picked-up image information/image acquisition section 514 are disposed at the positions transmitted from the position calculation section 515 on the three-dimensional space (step S5 of FIG. 5). The created three-dimensional images are transmitted to the display section 519.

Further, the number display section 522 calculates the number of the picked-up images to be displayed on the foremost surface on the three-dimensional image, and the calculated number of the picked-up images is transmitted to the display section 519.

The display section 519 displays the two-dimensional image transmitted from the two-dimensional image creation section 516, the three-dimensional image transmitted from the three-dimensional image creation section 517, the scroll bar instructed by the control section 523, and the number of the picked-up images transmitted from the number display section 522 on the display screen 102*a* (step S6 of FIG. 5).

Figure 8:
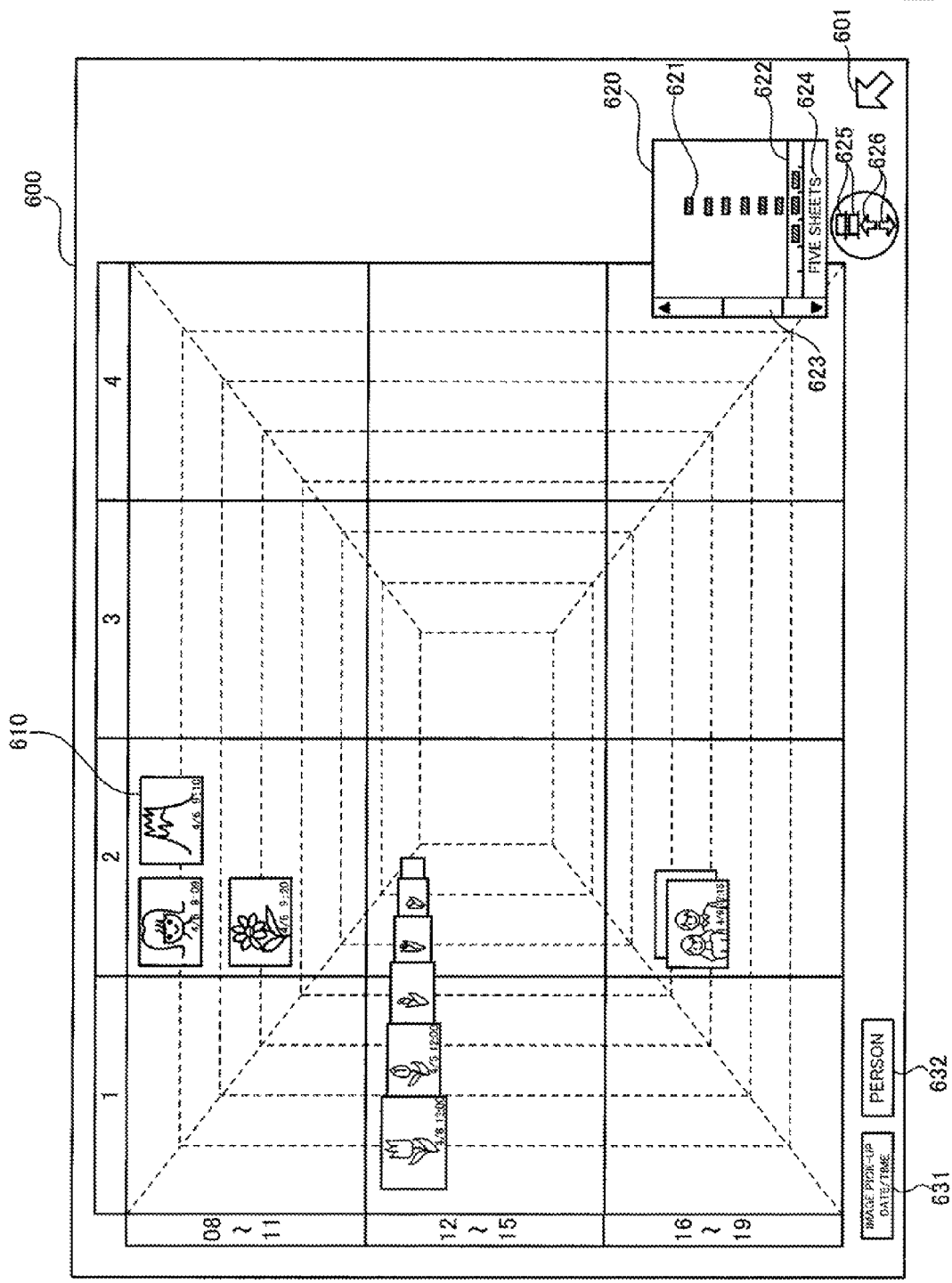
FIG. 8 is a view showing an example of a display screen on which a three-dimensional image, a two-dimensional image, and a scroll bar are displayed.

FIG. 8 is a view showing an example of the display screen 102*a* on which a three-dimensional image 600, a two-dimensional image 620, and the scroll bar 623 are displayed.

Note that in an initial state in which it is instructed to display the list as well as the three-dimensional image 600, the two-dimensional image 620, and the scroll bar 623 are displayed, only a region showing a period of one week from today as a start point is displayed in the three-dimensional image 600 and the two-dimensional image 620.

In the three-dimensional image 600 shown in FIG. 8, the thumbnail images 610 of the images picked up on the same date are arranged and displayed on the same surface. The positions of the thumbnail images 610 on the Y-axis show the time zones (each four hours) in which the images shown by the thumbnail images 610 are picked up, and the positions of the thumbnail images 610 on the X-axis show the times of each one hour in the time zones shown by the Y-axis. When, for example, the position of the thumbnail images 610 on the Y-axis is "8 o'clock to 11 o'clock", and the position thereof on the X-axis is "2", it is shown that the thumbnail images 610 are picked-up at "9 o'clock" which is a second earlier time in the time zones "8, 9, 10, and 11 o'clock" shown by the positions on the Y-axis. Further, an image pick-up date/time button 631, which is used to display the list of the picked-up images according to the "image pick-up date/time mode", and a person button 632, which is used to display the list of the picked-up images according to the "person mode" are also displayed side by side in the three-dimensional image 600.

As described above, according to the picked-up image display device 500 of the embodiment, since the thumbnail images of the images picked up on the same date are arranged on the same surface in the three-dimensional image 600, the images picked up, for example, in a school entrance ceremony can be confirmed collectively.

Further, the two-dimensional image 620 shown in FIG. 8 displays marks 621 at the positions, which correspond to the positions at which the respective thumbnail images 610 are disposed on the three-dimensional image 600, on the two-dimensional space in which each four hours are set to the X-axis and a date is set to the Y-axis. The marks 621 show the existence of the images which are picked up on the "date" shown by the Y-axis in the "time zone" shown by the X-axis. Whether or not images picked up on a predetermined date exist can be easily confirmed by looking at the two-dimensional image 620.

Further, the two-dimensional image 620 also displays the scroll bar 623, a frame 622, a number display section 624, a period change button 625, and a date change button 626. The scroll bar 623 extends along the Y-axis (date) and designates a date on the two-dimensional image 620, the frame 622 surrounds the range of the date selected by the scroll bar 623, the number display section 624 shows the number of the images picked up on the image pick-up date surrounded by the frame 622, the period change button 625 switches the period described above, and the date change button 626 switches the date.

The image pick-up date surrounded by the frame 622 is the image pick-up date of the picked-up images displayed on the foremost surface on the three-dimensional image 600, and the number of the images picked up on the same date can be easily recognized by confirming the number display section 624.

Further, when a right button of the mouse indicating a pointer 601 is clicked, a popup window 640 for selecting the thumbnail images is displayed.

Figure 9:
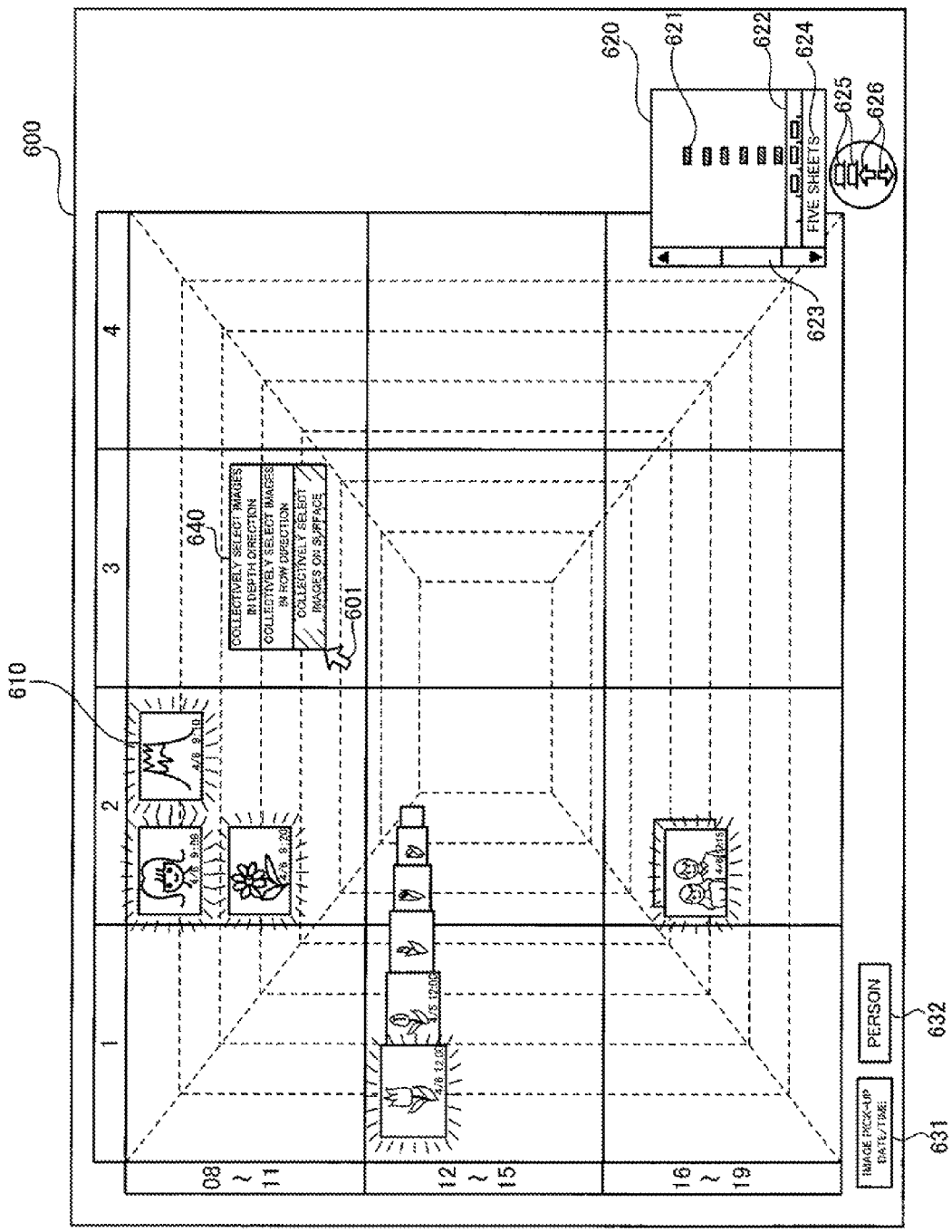
FIG. 9 is a view showing an example of the display screen after a popup window is displayed.

FIG. 9 is a view showing an example of the display screen 102a after the popup window 640 is displayed.

The popup window 640 shown in FIG. 9 provides a "depth menu", a "row menu", and a "surface menu". The "depth menu" is used to collectively select the thumbnail images of the images picked up in the same time zone, the "row menu" is used to collectively select the thumbnail images of the images picked up in the same time zone of the same date, and the "surface menu" is used to collectively select the thumbnail images of the images picked up on the same date.

When the user selects the thumbnail images 610 using the popup window 640 (step S7 of FIG. 5: Yes), designated contents are transmitted from the instruction section 511 of FIG. 4 to the emphasis display section 520 which displays the selected thumbnail images 610 and the marks 621 corresponding to the thumbnail images 610 in an emphasized fashion (step S8 of FIG. 5). In an example of FIG. 9, the "surface menu" of the popup window 640 is designated by the user, and the thumbnail images 610, which show the images picked up on the same date are collectively selected and displayed in the emphasized fashion (displayed by being lit). Further, the marks 621, which are disposed on the two-dimensional image 620 at the positions corresponding to the pick-up dates/times of the images represented by the selected thumbnail images 610 are also displayed in the emphasized fashion (voided display). As described above, since the selected thumbnail images and the mark images corresponding to the thumbnail images are displayed in the emphasized fashion, when the images represented by the thumbnail images currently selected were picked-up can be visually confirmed easily.

When the user clicks the mouse 104 shown in FIG. 1 on the right side thereof in the state that the thumbnail images 610 are selected, a popup window is displayed to store the picked-up images of the selected thumbnail images 610 to a recording medium.

When the user selects an instruction displayed on the popup window using the pointer 601 (step S9 of FIG. 5: Yes), the contents of the instruction are transmitted to the image storage section 521 of FIG. 4. The image storage section 521 acquires the picked-up image data of the selected thumbnail images 610 from the storage section 501, and the picked-up image data is stored in DVD (not shown) and the like mounted in place of the CD-ROM 300 on the personal computer 100, through the CD/DVD drive 114 shown in FIG. 2 (step S10 of FIG. 5).

As described above, according to the "image pick-up date/time mode", since a lot of picked-up images are stored in the storage section 501, even if the thumbnail images are overlapped in a depth direction on the three-dimensional image 600, on what day an image pick-up operation was executed and the like can be easily recognized by looking at the two-dimensional image 620.

The flow of the processing according to the "image pick-up date/time mode" has been described above, and the flow of a processing according to the "person mode" will be described next.

When the "person mode" is executed, a face image on which the face of a person is previously picked up is registered. A registration screen is previously prepared to the picked-up image display device 500 to register a face image. When the user selects a display button for displaying the registration screen by the mouse, the instruction section 511 shown in FIG. 4 instructs the image pick-up information/image acquisition section 514 to display the registration screen. The image pick-up information/image acquisition section 514 acquires the picked-up images stored in the storage section 501 and the acquired picked-up images are transmitted to the face extraction section 5181. The face extraction section 5181 extracts images of the faces in the picked-up images. The extracted images of the faces are transmitted to the display section 519, and the display section 519 displays the registration screen on the display screen 102a.

Figure 10:
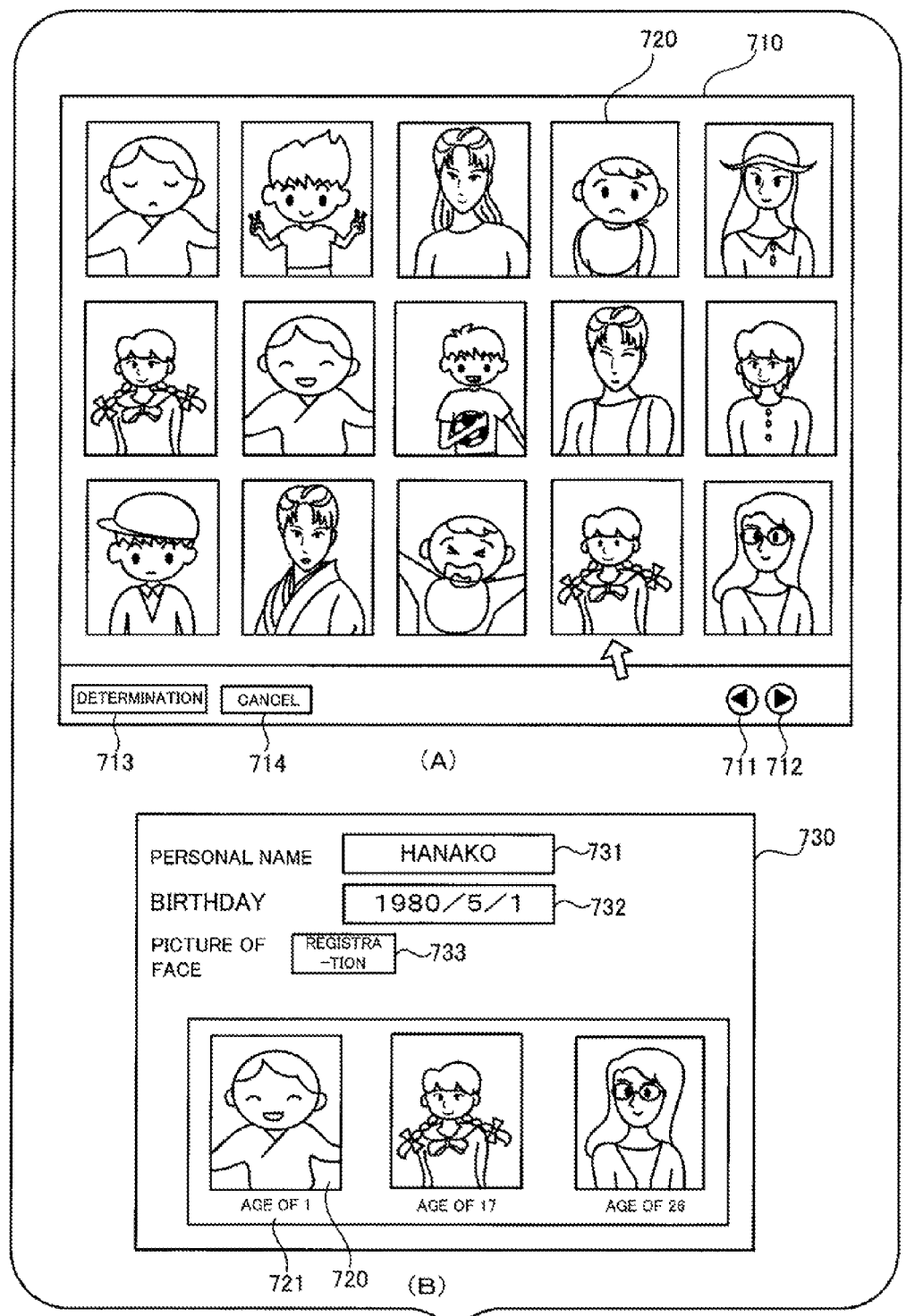
FIG. 10 is a diagram showing an example of a registration screen.

FIG. 10 is a diagram showing an example of the registration screen.

The registration screen 710 shown in part (A) of FIG. 10 displays face images 720 extracted from the picked-up images stored in the storage section 501. Further, the registration screen 710 is provided with a next button 712, a return button 711, a determination button 713, and a cancel button 714. The next button 712 is used to display face images 720 of a next page, the return button 711 is used to display face images 720 of a previous page, the determination button 713 is used to determine set contents, and the cancel button 714 is used to cancel the set contents. In the embodiment, plural face images 720 can be registered for one person. When the user selects the face image 720 of a predetermined person from the face images 720 displayed on the registration screen 710 and depresses the determination button 713, an information input screen 730 for inputting the information of the person is displayed.

The information input screen 730 shown in part (B) of FIG. 10 displays the face images 720 selected on the registration screen 710 shown in part (A) of FIG. 10. Further, the information input screen 730 is provided with a personal name input portion 731 for inputting a personal name, a birthday input portion 732 for inputting the birthday of a person, and a registration button 733 for determining set contents. When the user inputs the names and the birthdays of the persons, the birthdays are transmitted to the difference calculation section 5183 shown in FIG. 4. The difference calculation section 5183 calculates the ages of the persons, who have the faces in the face images 720, when the images thereof were picked up (hereinafter, called image pick-up time ages) based on the input birthdays and the image pick-up dates of picked-up images used as the sources of the face images 720. The calculated ages are transmitted to the display section 519 and displayed on an age display portion 721 of the information input screen 730. When the user selects the registration button 733, person information, which shows the image pick-up dates/times of the picked-up images used as the sources, the names and the birthdays of the persons, and the image pick-up time ages, are caused to correspond to the face images 720, and a set of the face images 720 and the person information is registered in the storage section 501 through the capture section 512 and the registration section 513. The registration section 513 is an example of the image registration section according to the present invention, and a processing for registering a person corresponds to an example of the image registration step in the image display method of the present invention.

When the user selects the person button 632 shown in FIG. 8, the instruction section 511 of FIG. 4 instructs the image pick-up information/image acquisition section 514 and the analyzing section 518 to execute the "person mode".

Figure 11:
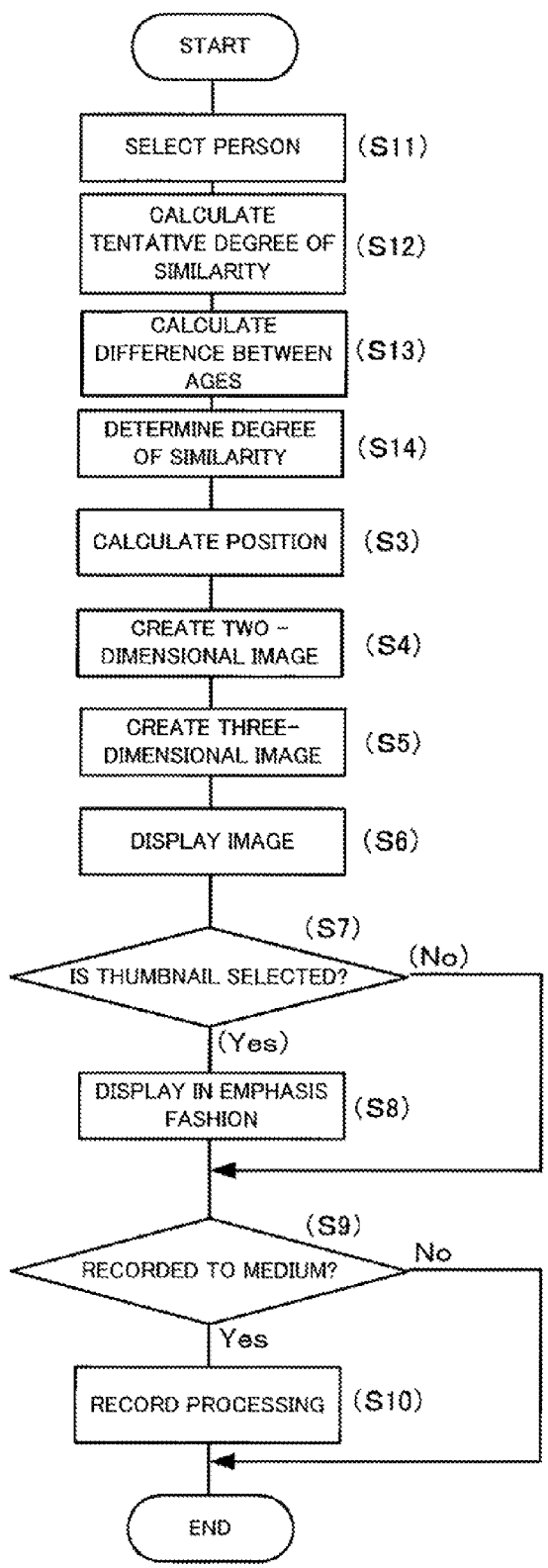
FIG. 11 a flowchart showing a flow of a processing executed in a person mode.

FIG. 11 is a flowchart showing a flow of a processing executed by the person mode.

When it is instructed to execute the "person mode", the image pick-up information/image acquisition section 514 acquires the set of the face images 720 and the person information registered to the storage section 501 and transmits the person information to the display section 519. The display section 519 displays a person selection screen on the display screen 102a to select a person.

Figure 12:
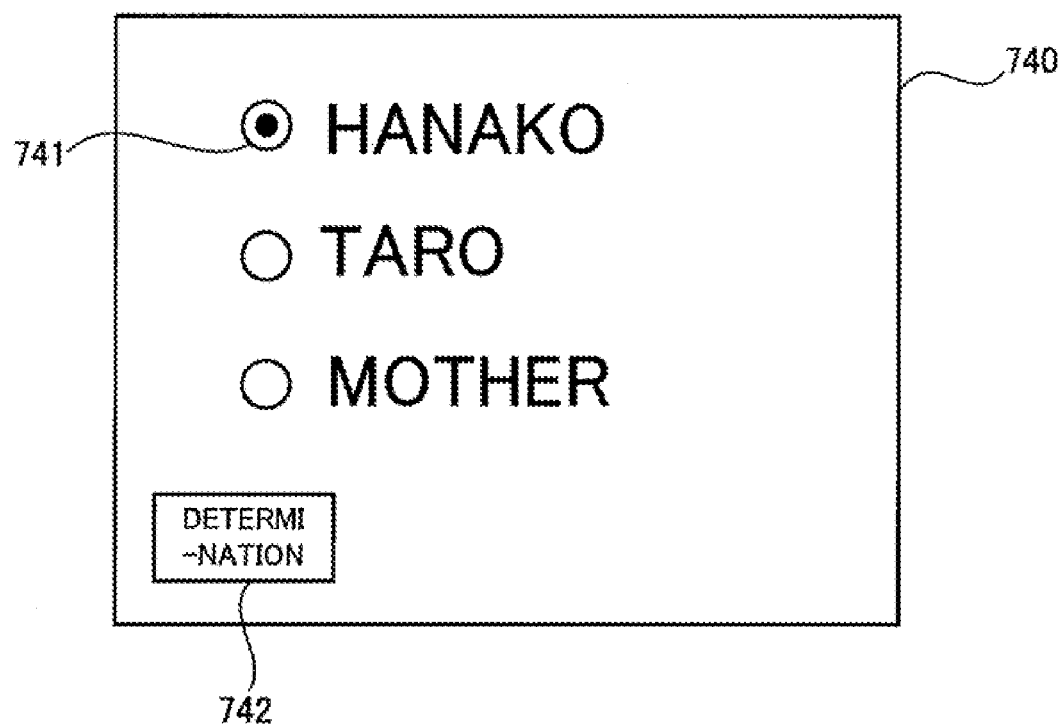
FIG. 12 is a view showing an example of a person selection screen.

FIG. 12 is a view showing an example of the person selection screen.

The person selection screen 740 displays the names of the persons registered in the storage section 501, and radio buttons 741 are displayed in parallel with the names of the persons to select one person. When the user selects one person using the mouse 104 and the like and depresses a determination button 742, selected contents are transmitted to the image pick-up information/image acquisition section 514 (step S11 of FIG. 11).

When the person is selected, the image pick-up information/image acquisition section 514 acquires the plural picked-up images and the image pick-up information stored in the storage section 501 and the face image 720 and the person information of the select person, transmits the plural picked-up images to the face extraction section 5181, transmits the face image 720 and the person information of the selected person to the degree of similarity calculation section 5182, and transmits the image pick-up information and the person information to the difference calculation section 5183 and the degree of similarity determination section 5184. The image pick-up information/image acquisition section 514 corresponds to an example of the image acquisition section according to the present invention, and the processing for acquiring the plural picked-up images corresponds to an example of the image acquisition step in the image display method of the present invention.

The face extraction section 5181 extracts faces from the plural picked-up images. Since a processing for extracting a face in an image is widely executed conventionally, the detailed description thereof is omitted. The extracted face image is transmitted to the degree of similarity calculation section 5182.

The degree of similarity calculation section 5182 calculates the tentative degree of similarity between the face image 720 and each of the faces extracted from the plural picked-up images (step S12 of FIG. 11). Since a technique for calculating the degree of similarity of the faces included in plural images is widely used in a person authentication system and the like, the detailed description thereof is omitted. A combination of the face extraction section 5181 and the degree of similarity calculation section 5182 corresponds to an example of the degree of similarity calculation section according to the present invention, and the processing for extracting a face in a picked-up image and calculating the degree of similarity between the extracted face and the registered face image 720 corresponds to an example of the degree of similarity calculation step in the image display method of the present invention.

When it is assumed that the person in the picked-up image is the person in the face image 720 based on the image pick-up date/time included in the image pick-up information which is caused to correspond to the plural picked-up images, on the image pick-up date/time included in the person information which is caused to correspond to the face image 720, and on the image pick-up time age included in the person information, the difference calculation section 5183 calculates the age of the person when the image of the person was picked up (hereinafter, called an assumed age) (step S13 of FIG. 11). The calculated assumed age is transmitted to the degree of similarity determination section 5184.

The degree of similarity determination section 5184 reduces the tentative degree of similarity calculated by the degree of similarity calculation section 5182 based on the assumed age calculated by the difference calculation section 5183 and on the image pick-up time age of the person in the face image 720 and determines the degree of similarity between the face in the face image 720 and the face in the picked-up image (step S14 of FIG. 11). A combination of the difference calculation section 5183 and the degree of similarity determination section 5184 corresponds to an example of the degree of similarity reduction section according to the present invention, and the processing at step S13 for reducing the tentative degree of similarity corresponds to an example of the degree of similarity reduction step according to the present invention. In the embodiment, the reduction ratio of degree of similarity is previously determined to each age.

Table 1 shows an example of the reduction ratio of degree of similarity for each age.

TABLE 1

| Age | Reduction ratio |
|---|---|
| 0-1 | 20% |
| 1-2 | 20% |
| 2-3 | 10% |
| 3-4 | 10% |
| ... | 10% |
| 19-20 | 10% |
| 20-21 | 10% |
| 22-23 | 5% |
| ... | 5% |

Each time the image pick-up time age approaches the assumed age by one year, the degree of similarity is reduced from the tentative degree of similarity by the reduction ratio shown in Table 1. When, for example, the image pick-up time age of the person in the face image 720 is five and the assumed age of the person in the picked-up image to be analyzed is one, the reduction ratio of the degree of similarity is calculated by the following expression.

Reduction ratio (ages 1→5)=[Reduction ratio 20 for ages 0-2]+[Reduction ratio 10 for ages 2-3]+[Reduction ratio 10 for ages 3-4]+[Reduction ratio 10 for ages 4-5]=50%

The degree of similarity of the assumed age (one year old) of the person in the picked-up images with respect to the person (five years old) in the face image 720 is calculated by the following equation.

$$\text{Degree of similarity} = \text{Tentative degree of similarity} \times (100 - \text{Reduction ratio (50)})$$

In the embodiment, the larger the difference between the assumed age and the image pick-up time age is, the more the reduction ratio increases. When, for example, the face of a mother in her young days well resembles the face of her daughter at present, a large tentative degree of similarity is calculated based on the shapes of their faces. However, since the pick-up date/time of a picked-up image on which the face of the mother in her young days is picked up is greatly different from the image pick-up date/time of the face image on which the face of the daughter at present is picked up, the assumed age of the picked-up image is greatly different from the image pick-up time age of the face image, and thus the reduction ratio is increased. As a result, according to the image display device of the embodiment, even the faces of a parent and a child who resemble well and the like can be accurately determined.

Further, in the embodiment, when the assumed age and the image pick-up time age are in between zero and two, the degree of similarity is greatly reduced, whereas when they exceed the age of twenty, the reduction ratio of the degree of similarity is suppressed. Although most of children of two years or less have a similar face of a roundish shape in its entirety, when they become about two years or more, their faces change from each other in many cases. On the contrary, when persons become older than twenty years, their faces ordinarily change gently. Therefore, the degree of similarity between the face in the face images 720 and the face in the picked-up image can be accurately analyzed by increasing the reduction ratio of the degree of similarity from ages zero to two and suppressing the reduction ratio of the degree of similarity of the years exceeding the age of twenty.

The degrees of similarity between the plural picked-up images calculated as described above are transmitted to the position calculation section 515.

The position calculation section 515 calculates a three-dimensional position, to which the degree of similarity transmitted from the degree of similarity determination section 5184 corresponds, on a three-dimensional space, which has three axes, that is, an axis showing a picked-up time zone, an axis showing an image picked-up date, and an axis showing a degree of similarity and calculates a two-dimensional position, which corresponds to the three-dimensional position, on a two-dimensional space having two axes, that is, an axis showing the image pick-up time zone and an axis showing the degree of similarity (step S3 of FIG. 11).

Figure 13:
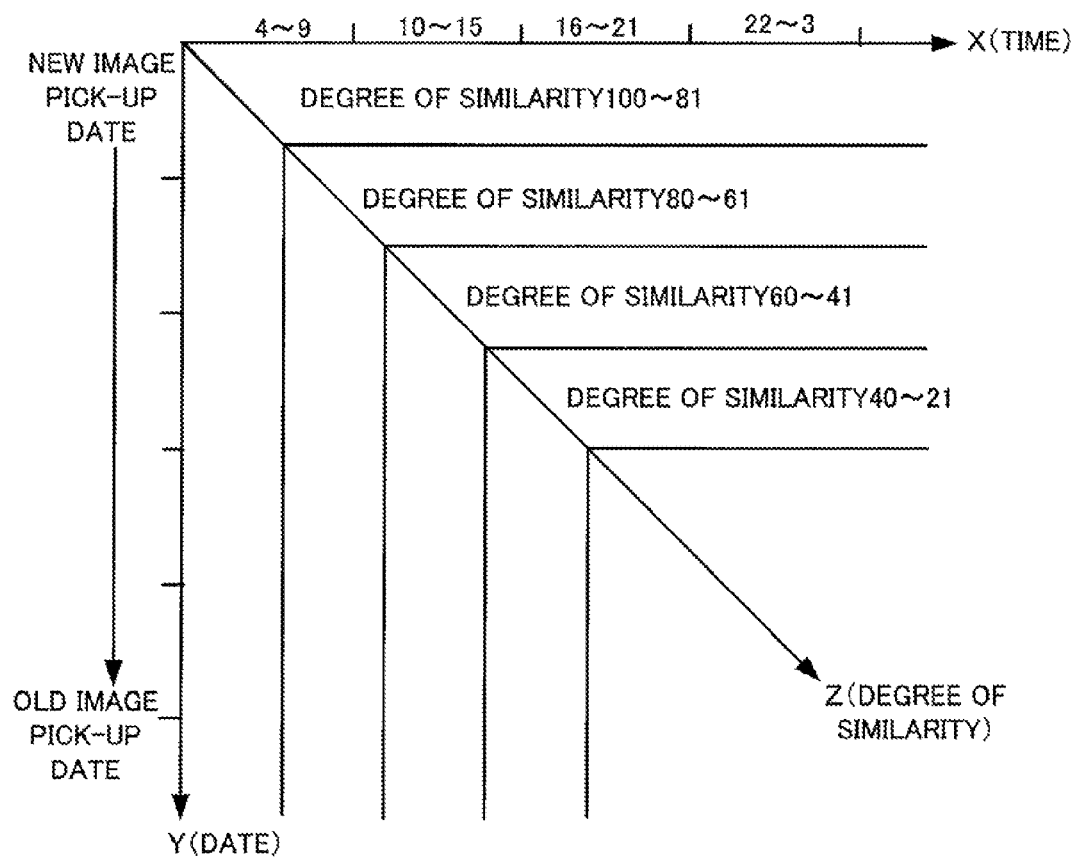
FIG. 13 is a conceptual view showing an example of the three-dimensional space.

FIG. 13 is a conceptual view showing an example of the three-dimensional space.

As shown in FIG. 13, in the embodiment, the three-dimensional space is applied which has the X-axis (lateral direction) showing the image pick-up time zone, the Y-axis (longitudinal direction) showing the image pick-up date, and the Z-axis (depth direction) showing the degree of similarity.

Respective six hours of from 10 o'clock to 15 o'clock, from 16 o'clock to 21 o'clock, and from 22 o'clock to 3 o'clock are sequentially allocated to the X-axis of the three-dimensional space using the six hours from 4 o'clock to 9 o'clock as a start point.

The image pick-up dates/times are sequentially allocated to the Y-axis of the three-dimensional space from a later one.

The degrees of similarity 80 to 61, 60 to 41, . . . , are sequentially allocated to the Z-axis of the three-dimensional space from the degrees of similarity 100 to 81 as a start point.

Further, in the embodiment, the two-dimensional space is applied which has the X-axis (lateral direction) showing the image pick-up time zone and the Z-axis (longitudinal direction) showing the degree of similarity.

The position calculation section 515 calculates the position on the two-dimensional space (two-dimensional position) and the position on the three-dimensional space (three-dimensional position) based on the degree of similarity transmitted from the degree of similarity determination section 5184 and the image pick-up date/time of the picked-up image. The calculated two-dimensional position is transmitted to the two-dimensional image creation section 516, and the three-dimensional position is transmitted to the three-dimensional image creation section 517.

The two-dimensional image creation section 516 creates the two-dimensional image (step S4 of FIG. 11), the three-dimensional image creation section 517 creates the three-dimensional image (step S5 of FIG. 11), and the number display section 522 calculates the number of the picked-up images to be displayed on the foremost surface on the three-dimensional image.

The display section 519 displays the two-dimensional image created by the two-dimensional image creation section 516, the three-dimensional image created by the three-dimensional image creation section 517, the scroll bar, and the number of the picked-up images calculated by the number display section 522 on the display screen 102a (step S6 of FIG. 11). A combination of the three-dimensional image creation section 517 and the display section 519 corresponds to an example of the display section according to the present invention, a combination of the two-dimensional image creation section 516 and the display section 519 corresponds to an example of the auxiliary display section according to the present invention, and a combination of the number display section 522 and the display section 519 corresponds to an example of the image number display section according to the present invention.

Figure 14:
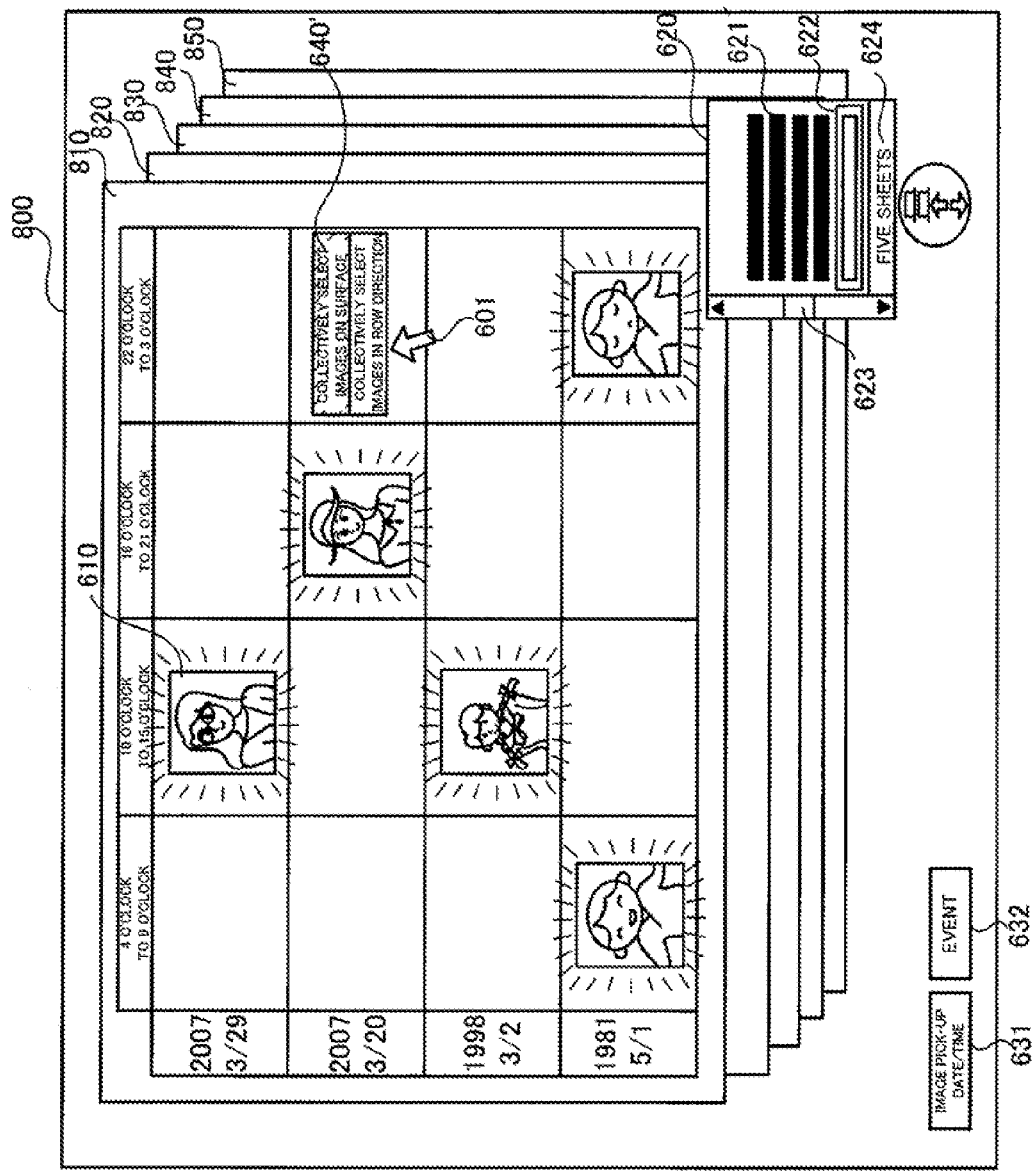
FIG. 14 is a view showing an example of a person display screen on which the three-dimensional image, the two-dimensional image, and the scroll bar are displayed.

FIG. 14 is a view showing an example of a person display screen 800 on which three-dimensional images 810 to 850, a two-dimensional image 620, and a scroll bar 623 are displayed.

The person display screen 800 displays the five three-dimensional images 810, 820, 830, 840, and 850 on which picked-up images each having a different degree of similarity band are disposed. These five three-dimensional images 810, 820, 830, 840, and 850 are disposed in the Z-axis direction (depth direction) in the sequence of a three-dimensional image having a larger degree of similarity band with the three-dimensional image 810 having the largest degree of similarity band disposed on a foremost surface. In the three-dimensional image 810 on the foremost surface, the thumbnail image 610s of the picked-up image including the face having a degree of similarity (which is 100 to 81) as large as that of the face in the face image 720 selected at step S11 are arranged and displayed on the same surface. The positions of the respective thumbnail images 610 on the Z-axis show the degrees of similarity of the picked-up images that are the sources of the thumbnail images 610, the positions of the respective thumbnail images 610 on the Y-axis show the image pick-up dates/times of the picked-up images that are the sources of the thumbnail images 610, and the positions of the respective thumbnail images 610 on the X-axis show the image pick-up time zones of the picked-up images that are the sources of the thumbnail images 610.

As described above, according to the picked-up image display device 500 of the embodiment, since the thumbnail images of the picked-up images including faces having approximately the same degree of similarity are arranged on the same surface in the three-dimensional image 600, even if a lot of picked-up images are stored, a picked-up image including a face which resembles a desired face can be easily found from the picked-up images.

Further, plural marks 621', which extend along the X-axis (image pick-up time zone), are disposed on the two-dimensional image 620 and show respective degrees of similarity. Further, the two-dimensional image 620 also displays the scroll bar 623, which extends along the Y-axis (degree of similarity) and designates a degree of similarity on the two-dimensional image 620, the frame 622, which surrounds the mark 621' showing the degree of similarity selected by the scroll bar 623, the number display section 624, which shows the number of the picked-up images from which the degree of similarity selected by the scroll bar 623 is calculated, and the like.

When the user scrolls the scroll bar 623, the instruction section 511 shown in FIG. 4 switches a degree of similarity in response to an amount of scroll, and the switched degree of similarity is transmitted to the control section 523. The control section 523 instructs the two-dimensional image creation section 516 and the three-dimensional image creation section 517 to switch the degree of similarity to thereby move the frame 622 on the two-dimensional image 620 to the position of the switched degree of similarity as well as to dispose the three-dimensional image having the switched degree of similarity again so that it is displayed on the foremost surface. The instruction section 511 corresponds to an example of the designation section according to the present invention, and the control section 523 corresponds to an example of the display control section according to the present invention.

Figure 15:
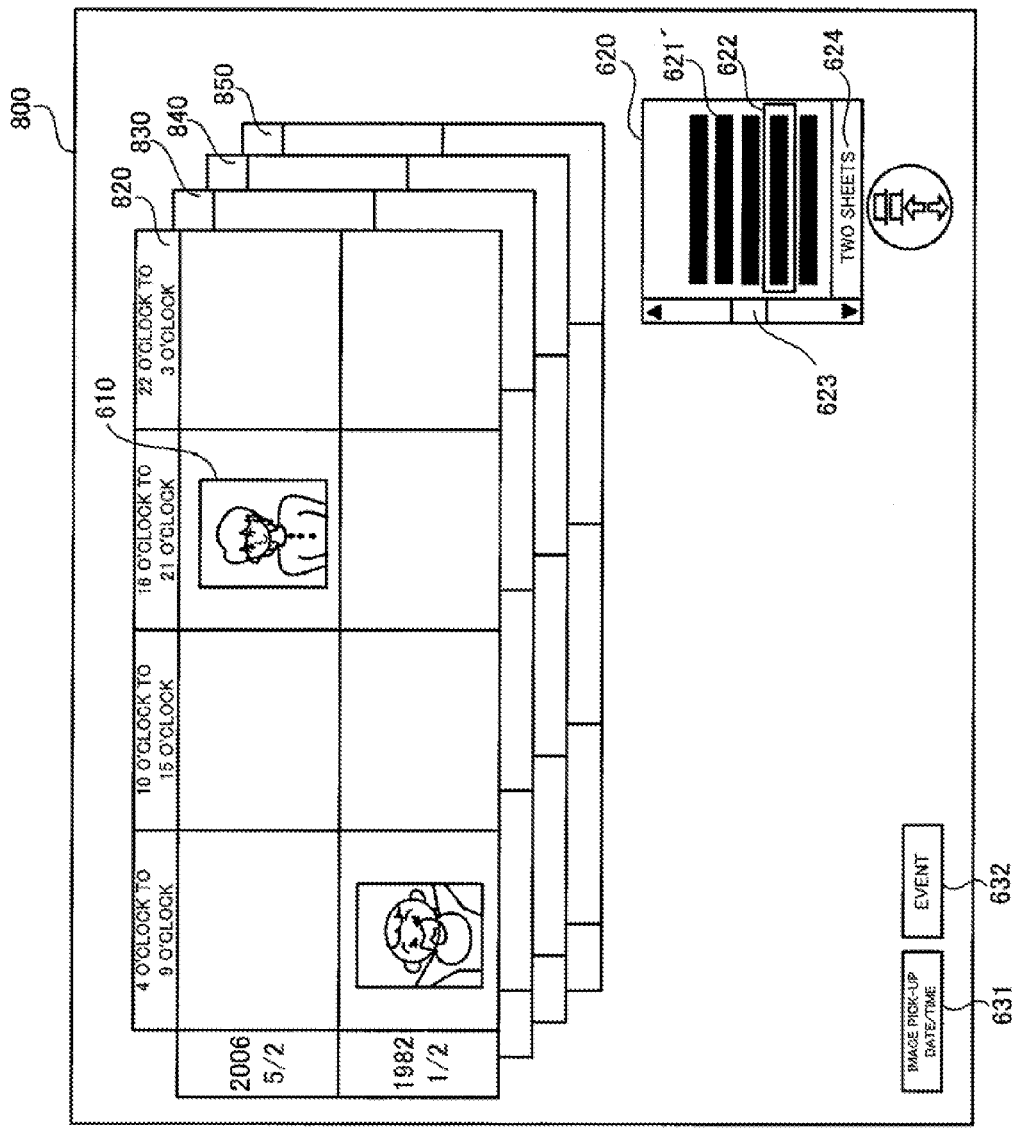
FIG. 15 is a view showing an example of the person display screen after a degree of similarity is switched.

FIG. 15 is a view showing an example of the person display screen 800 after the degree of similarity is switched.

In FIG. 15, the frame 622 surrounds the mark 621' which shows a second degree of similarity, the number display section 624 shows the number of the picked-up images which belong to the second degree of similarity. Further, the three-dimensional image 820, on which the thumbnail images 610 of the picked-up images having the second degree of similarity band are disposed, is displayed on a foremost surface.

The user can easily switch the three-dimensional image to be displayed by making use of the scroll bar 623.

Further, as shown in FIG. 14, when the user clicks the right button of the mouse indicating the pointer 601, a popup window 640' is displayed to select a thumbnail image.

The popup window 640' shown in FIG. 14 provides a "surface menu" and a "row menu". The "surface menu" is used to collectively select the thumbnail images showing the picked-up images which belong to the same degree of similarity band, and the "row menu" is used to collectively select the thumbnail images showing the picked-up images which belong to the same degree of similarity band and were picked up on the same image pick-up date.

When the user selects a thumbnail image 610 using the popup window 640' (step S7 of FIG. 11: Yes), designated contents are transmitted from the instruction section 511 of FIG. 4 to the emphasis display section 520 of FIG. 4, and the emphasis display section 520 displays a selected thumbnail image 610 and a mark 621 corresponding to the thumbnail image 610 in the emphasized fashion (step S8 of FIG. 11) likewise the "image pick-up date/time mode" shown in FIG. 5.

Further, when the user clicks the mouse 104 shown in FIG. 1 on the right side thereof in the state that the thumbnail image 610 is selected, a popup window is displayed to store the picked-up image of the selected thumbnail image 610 to the recording medium.

When the user selects an instruction displayed on the popup window using the pointer 601 (step S9 of FIG. 11: Yes), instructed contents are transmitted to the image storage section 521 of FIG. 4, and the picked-up image data of the selected thumbnail image 610 is stored in the DVD (not shown) and the like mounted on the personal computer 100 (step S10 of FIG. 11).

As described above, according to the embodiment, the degree of similarity between the face image of a predetermined person and the face in a picked-up image can be accurately analyzed, and the result of analysis can be displayed so that it can be viewed easily.

The embodiment described so far is the first embodiment of the present invention, and subsequently a second embodiment of the present invention will be described. The second embodiment of the present invention has the same arrangement as that of the first embodiment except that a method of reducing a degree of similarity in a degree of similarity determination section of the second embodiment is different from that of the first embodiment. Hereinafter, only the features of the second embodiment different from those of the first embodiment will be described.

In an image display device of the embodiment, plural face images 720, which have image pick-up times different from each other, are registered to one person as shown in part (B) of FIG. 10.

When the degree of similarity determination section 5184 shown in FIG. 4 reduces a tentative degree of similarity calculated by a degree of similarity calculation section 5182, first, a reduction ratio is calculated using the plural registered face images 720.

In the embodiment, a picked-up image is compared with a latest face image 720 of plural registered face images 720. When, for example, the assumed age of a person in the picked-up image is one and the image pick-up time age of the latest face image 720 is five, first, the degree of similarity between the face image 720 at the age of five and the face image 720 at the age of one is calculated. Subsequently, the degree of similarity of the picked-up image is calculated using the tentative degree of similarity calculated by the degree of similarity calculation section 5182 and the calculated degree of similarity between the face images using the following equation.

Degree of similarity=Tentative degree of similarity× (Degree of similarity between face images 720/ 100)

As described above, the degree of similarity can be also accurately analyzed by analyzing how the face of a registered person changes as the person ages and making use the result of analysis as a reduction ratio.

Although the example in which thumbnail images are created when picked-up images are registered has been described above, the image display section according to the present invention may create thumbnail images when a list of picked-up images is displayed.

Further, although the example in which a face image is selected from the stored picked-up images has been described above, the image registration section according to the present invention may input a face image from an external device.

What is claimed is:

1. An image display device comprising a memory and a processing circuit to execute a program for performing a process, the process comprising:
   acquiring a plurality of picked-up images with which image pick-up dates and/or times and an age are associated from the memory;
   registering a face image which shows a picked-up face and with which an image pick-up date and/or time is associated;
   detecting a face of each of the plurality of picked-up images acquired by the acquiring;
   calculating the degree of similarity between the face detected by the detecting and the face in the face image registered by the registering;
   reducing the degree of similarity of the face calculated by the calculating according to a degree of reducing in which as a difference between the image pick-up date and/or time associated with the picked-up image and the image pick-up date and/or time associated with the face image increases, the degree of reducing gradually increases and which is also based on the age; and
   first displaying the plurality of picked-up images acquired by the acquiring in descending order of degree of similarity.

2. An image display device comprising a memory and a processing circuit to execute a program for performing a process, the process comprising:
   acquiring a plurality of picked-up images with which image pick-up dates and/or times and an age are associated from the memory;
   registering a face image which shows a picked-up face and with which an image pick-up date and/or time is associated;
   detecting a face of each of the plurality of picked-up images acquired by the acquiring;
   calculating the degree of similarity between the face detected by the detecting and the face in the face image registered by the registering;
   reducing the degree of similarity of the face calculated by the calculating according to a degree of reducing in which as a difference between the image pick-UP date and/or time associated with the picked-up image and the image pick-up date and/or time associated with the face image increases, the degree of reducing gradually increases and which is also based on the age; and
   first displaying the plurality of picked-up images acquired by the acquiring in descending order of degree of similarity;
   wherein the first displaying includes displaying a three-dimensional space having an axis of the degree of similarity and disposes the picked-up image at the position of the degree of similarity of the picked-up image reduced by the reducing on the three-dimensional space.

3. The image display device according to claim 1, wherein the process further comprises:
   second displaying in an auxiliary manner a two-dimensional space having an axis of the degree of similarity; and
   disposing a mark at the position of the degree of similarity of the picked-up image reduced by the degree of similarity reduction section on the two-dimensional space to show that the picked-up image exists.

4. An image display device comprising a memory and a processing circuit to execute a program for performing a process, the process comprising:
   acquiring a plurality of picked-up images with which image pick-up dates and/or times and an age are associated from the memory;
   registering a face image which shows a picked-up face and with which an image pick-up date and/or time is associated;
   detecting a face of each of the plurality of picked-up images acquired by the acquiring;
   calculating the degree of similarity between the face detected by the detecting and the face in the face image registered by the registering;
   reducing the degree of similarity of the face calculated by the calculating according to a degree of reducing in which as a difference between the image pick-UP date and/or time associated with the picked-up image and the image pick-up date and/or time associated with the face image increases, the degree of reducing gradually increases and which is also based on the age;
   first displaying the plurality of picked-up images acquired by the acquiring in descending order of degree of similarity;
   second displaying in an auxiliary manner a two-dimensional space having an axis of the degree of similarity;
   disposing a mark at the position of the degree of similarity of the picked-up image reduced by the degree of similarity reduction section on the two-dimensional space to show that the picked-up image exists;
   designating the degree of similarity on the two-dimensional space by displaying a designation frame along an axis different from the axis of the degree of similarity on the two-dimensional space, and moving the designation frame along the axis of the degree of similarity; and
   causing the first displaying to dispose the picked-up image having the degree of similarity designated by the designating on a foremost surface in a three-dimensional space.

5. The image display device according to claim 1, wherein the process further comprises third displaying the number of the picked-up images having the degree of similarity designated by the designating.

6. The image display device according to claim 1, wherein the acquiring includes acquiring the plurality of picked-up images from memory in which the plurality of picked-up images are stored.

7. A non-transitory image display program storage medium that stores an image display program which is executed in a computer to perform a process, the process comprising:
   acquiring a plurality of picked-up images with which image pick-up dates and/or times and an age are associated;
   registering a face image which shows a picked-up face and with which an image pick-up date and/or time is associated;

detecting a face of each of the plurality of picked-up images acquired by the acquiring;

calculating the degree of similarity between the face detected by the detecting and the face in the face image registered by the registering;

reducing the degree of similarity of the face calculated by the calculating according to a degree of reducing in which as a difference between the image pick-up date and/or time associated with the picked-up image and the image pick-up date and/or time associated with the face image increases, the degree of reducing gradually increases and which is also based on the age; and displaying the plurality of picked-up images acquired by the acquiring in descending order of degree of similarity.

8. An image display method comprising:

acquiring a plurality of picked-up images with which image pick-up dates and/or times and an age are associated;

registering a face image which shows a picked-up face and with which an image pick-up date and/or time is associated;

detecting a face of each of the plurality of picked-up images acquired by the acquiring;

calculating the degree of similarity between the face detected by the detecting and the face in the face image registered by the registering;

reducing the degree of similarity of the face calculated by the calculating according to a degree of reducing in which as a difference between the image pick-up date and/or time associated with the picked-up image and the image pick-up date and/or time associated with the face image increases, the degree of reducing gradually increases and which is also based on the age; and displaying the plurality of picked-up images acquired in the acquiring in descending order of degree of similarity.

* * * * *